United States Patent
Klein

(10) Patent No.: US 7,478,865 B2
(45) Date of Patent: Jan. 20, 2009

(54) TRAILER ASSEMBLY

(75) Inventor: Richard Klein, Ann Arbor, MI (US)

(73) Assignee: FCS Industries, Inc., Taylor, MI (US)

(*) Notice: Subject to any disclaimer, the term of this patent is extended or adjusted under 35 U.S.C. 154(b) by 0 days.

(21) Appl. No.: 11/715,352

(22) Filed: Mar. 7, 2007

(65) Prior Publication Data
US 2007/0284912 A1   Dec. 13, 2007

Related U.S. Application Data

(60) Provisional application No. 60/811,956, filed on Jun. 8, 2006.

(51) Int. Cl.
*B62D 33/00* (2006.01)
(52) U.S. Cl. ............................. 296/182.1; 296/186.1
(58) Field of Classification Search ............. 296/182.1, 296/186.1, 191, 168, 185.1, 36, 29, 104, 296/210, 3; 280/423.1
See application file for complete search history.

(56) References Cited

U.S. PATENT DOCUMENTS

| | | | | |
|---|---|---|---|---|
| 2,406,863 A * | 9/1946 | Swann | ...................... | 52/462 |
| 2,513,829 A * | 7/1950 | Vaughn | ...................... | 52/56 |
| 2,650,185 A * | 8/1953 | Larson et al. | .............. | 156/310 |
| 2,921,814 A * | 1/1960 | Mede | ...................... | 296/210 |
| 2,934,372 A * | 4/1960 | Jewell et al. | .............. | 296/186.1 |
| 2,966,436 A | 12/1960 | Fox et al. | | |
| 3,061,364 A * | 10/1962 | Tantlinger et al. | ........ | 296/185.1 |
| 3,334,007 A * | 8/1967 | Flagan | ...................... | 296/191 |
| 3,359,693 A * | 12/1967 | Mitas | ...................... | 52/64 |
| 3,429,083 A * | 2/1969 | Voros | ...................... | 52/53 |
| 3,962,015 A | 6/1976 | Heimann | | |
| 4,018,480 A * | 4/1977 | Stone | ...................... | 296/183.1 |
| 4,089,558 A * | 5/1978 | Banerjea et al. | ............ | 296/214 |
| 4,145,080 A * | 3/1979 | Miller et al. | .............. | 296/24.35 |
| 4,212,405 A * | 7/1980 | Schmidt | .................. | 296/182.1 |
| 4,214,789 A * | 7/1980 | Katz et al. | ................. | 296/186.3 |
| 4,372,568 A * | 2/1983 | Campbell | .................. | 296/173 |
| 4,422,558 A | 12/1983 | Mittelmann et al. | | |
| 4,623,189 A * | 11/1986 | Stead | ...................... | 296/186.2 |
| 4,652,042 A | 3/1987 | Bader | | |
| 5,069,737 A * | 12/1991 | Guiton | ...................... | 156/210 |
| 5,112,099 A * | 5/1992 | Yurgevich et al. | ........ | 296/186.1 |
| 5,190,341 A * | 3/1993 | Simard | .................. | 296/100.1 |

(Continued)

FOREIGN PATENT DOCUMENTS

GB      2 028 960 A      3/1980

*Primary Examiner*—Kiran B. Patel
(74) *Attorney, Agent, or Firm*—Brinks Hofer Gilson & Lione

(57) ABSTRACT

A trailer body for use with a commercial motor vehicle is provided, including a top wall, a floor, and a pair of side walls cooperating to define a cargo space, and a plurality of supports each extending substantially across the trailer body between the side walls. The top wall includes an interior surface and an exterior surface, and the supports are connected to the exterior surface of the top wall such that at least a substantial portion of the interior surface of the top wall is generally smooth. The trailer body may also include a protective assembly adjacent to a rear door of the trailer body to protect the trailer body during loading and unloading of cargo into and from the cargo space.

8 Claims, 4 Drawing Sheets

U.S. PATENT DOCUMENTS

| | | | |
|---|---|---|---|
| 5,199,632 A * | 4/1993 | Takeichi et al. | 228/181 |
| 5,267,515 A * | 12/1993 | Tsuruda et al. | 296/191 |
| 5,299,405 A * | 4/1994 | Thompson | 52/783.11 |
| 5,450,977 A * | 9/1995 | Moe | 220/592.09 |
| 5,492,747 A | 2/1996 | Kemp et al. | |
| 5,584,252 A * | 12/1996 | Smith et al. | 296/186.1 |
| 5,584,527 A * | 12/1996 | Sitter | 296/186.1 |
| 5,601,034 A * | 2/1997 | Tao et al. | 105/423 |
| 5,664,826 A | 9/1997 | Wilkens | |
| 5,681,076 A * | 10/1997 | Yoshii | 296/210 |
| 5,702,151 A | 12/1997 | Grote et al. | |
| 5,730,578 A * | 3/1998 | Smidler | 414/495 |
| 5,916,093 A * | 6/1999 | Fecko et al. | 52/17 |
| 5,988,074 A * | 11/1999 | Thoman | 296/215 |
| 6,374,546 B1 * | 4/2002 | Fecko et al. | 52/17 |
| 6,502,895 B2 * | 1/2003 | Taylor | 296/178 |
| 6,527,335 B1 * | 3/2003 | Yurgevich | 296/186.1 |
| 6,722,287 B2 * | 4/2004 | Norton et al. | 105/404 |
| 6,761,840 B2 * | 7/2004 | Fecko et al. | 264/31 |
| 6,793,271 B1 | 9/2004 | Deets | |
| 6,802,521 B1 | 10/2004 | Boughton | |
| 6,893,075 B2 | 5/2005 | Fenton et al. | |
| 7,025,408 B2 * | 4/2006 | Jones et al. | 296/186.1 |
| 7,066,529 B2 * | 6/2006 | Yurgevich et al. | 296/186.1 |
| 7,097,225 B2 * | 8/2006 | Huisingh et al. | 296/37.7 |
| 7,134,711 B1 * | 11/2006 | Yoder | 296/210 |
| 7,210,727 B2 * | 5/2007 | Stephenson et al. | 296/104 |
| 7,296,704 B2 | 11/2007 | Ferrini | |
| 2006/0045681 A1 | 3/2006 | Norris, Jr. | |
| 2007/0132281 A1 * | 6/2007 | Ehrlich | 296/210 |
| 2008/0023988 A1 * | 1/2008 | Ochoa | 296/191 |

* cited by examiner

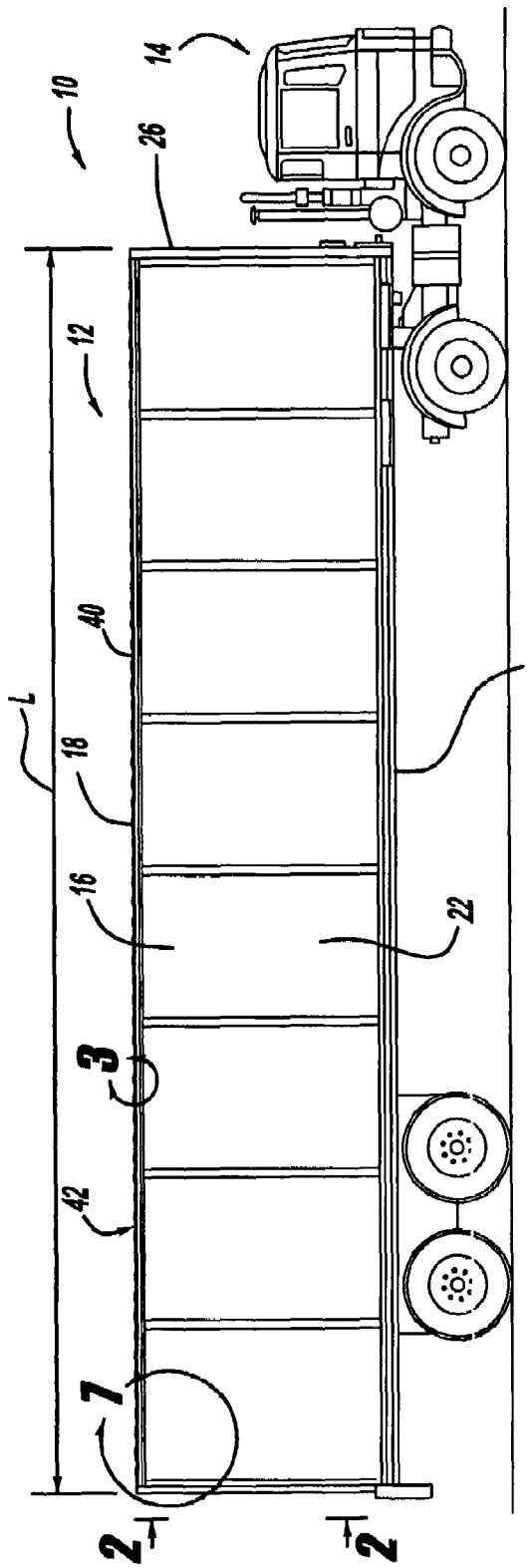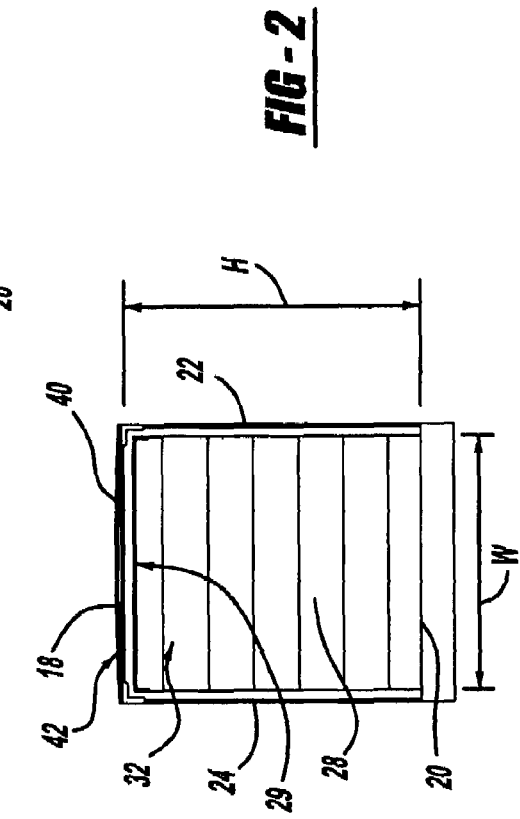

TRAILER ASSEMBLY

CROSS-REFERENCE TO RELATED APPLICATION

This patent application claims the benefit under 35 U.S.C. § 119(e) of U.S. provisional patent application Ser. No. 60/811,956, filed Jun. 8, 2006 and entitled TRAILER ROOF ASSEMBLY, the entire contents of which are incorporated herein by reference.

FIELD OF THE INVENTION

This invention relates to a trailer assembly, particularly a trailer assembly adapted for commercial trucking applications.

BACKGROUND OF THE INVENTION

Commercial trucking provides a substantial proportion of commercial transportation of goods throughout the world. One common type of commercial truck is a tractor trailer, which includes a semi-trailer coupled with a road tractor. The term "semi-trailer" typically refers to a trailer having one or more rear axles and no front axles. During operation, a large proportion of the weight of the semi-trailer is supported either by the road tractor or by a detachable front axle assembly known as a dolly. Semi-trailers are also normally equipped with legs that can be lowered to support the semi-trailer when it is uncoupled from the dolly or the road tractor.

As used herein, the term, "commercial motor vehicle" refers to any self-propelled or towed motor vehicle for use on a highway in interstate commerce to transport passengers or property and having a gross vehicle weight rating of 4,536 kilograms (approximately 10,000 pounds) or more. As used herein, the term, "gross vehicle weight rating" is the maximum allowable weight of a fully equipped tow vehicle including passengers and cargo. As used herein, the term, "Class A commercial motor vehicle" refers to any commercial vehicle having a gross vehicle weight rating ("GVWR") of at least 11,793 kilograms (approximately 26,000 pounds).

Currently, in the United States, semi-truck trailers are on the order of 40 to 53 feet long and have a rear swing door providing an opening of about 110 inches high and 100 inches wide. Trucking operators seek to maximize the utilization of interior space within the trailer. Forklift trucks are typically used to load cargo into trailers. Specifically, cargo is supported by a pallet, which is lifted vertically by the forklift truck and deposited in the trailer. It is common for the forklift truck or other loading machine to push cargo from the rear open door of the trailer toward the front.

The typical trailer construction utilizes a roof of sheet metal or other opaque sheet material supported by a number of transversely extending reinforcing ribs or bows. These bows are exposed to the inside of the trailer and form irregularities on the inside surface of the trailer roof. During the loading process, it is unfortunately common for cargo to come in contact with one of the bows, potentially causing damage to the roof structure. Due to fear of damaging trailers in this manner, operators are often not able to fully utilize the interior capacity of the trailer. Damage to internally exposed roof bows during the cargo loading and unloading process imposes a significant operating cost burden on motor carrier operators and can cause shipping delays.

During the loading or unloading processes, it is also unfortunately common for cargo to come into contact with the rear frame of the trailer. For example, cargo may contact the upper portion of the rear door frame, thereby potentially causing structural damage to the trailer and/or the cargo. Specifically, the upper portion of the rear door frame of the trailer generally extends perpendicularly from the roof panel such that cargo contacting the upper portion causes a relatively abrupt collision between the respective structures, especially during the unloading process when the cargo is being transported relatively close to the roof inner surface.

Additionally, the bows are currently secured to the inside of the trailer by a plurality of fasteners. However, during installation, the bows may be displaced or misaligned before being secured to the trailer by the fasteners. Misalignment of the bows may cause irregularities in the roof structure or a weakened connection between the bows and the trailer.

Furthermore, the opaque nature of currently-known trailer roofs causes the cargo space within the trailer to be generally void of natural light. Therefore, artificial light typically must be provided during loading and unloading of the cargo space.

SUMMARY OF THE INVENTION

This invention seeks to address the above-mentioned shortcomings of the prior art. A trailer having a roof assembly constructed in accordance with the present invention features a smooth inside roof surface. This is achieved by using transversely extending reinforcing bows which are mounted on the exterior or upper surface of the roof. The bow preferably have an inverted "U" shaped cross sectional configuration with a pair of flanges which engage the upper surface of the roof panel.

A preferred panel material is a translucent composite material such as a fiberglass or other polymer material. By utilizing a translucent material, ambient light can reach the inside of the trailer which is convenient for trailer loading and unloading operators.

In order to provide a seamless roof panel structure to prevent water leakage, it is preferred that the external transversely extending roof bows are bonded to the roof using adhesive materials or tapes. It is preferred that the roof panel is held in position to the side, front, and rear panels of the trailer through the use of frame rails which sandwich the roof panel between the frame rail and the existing perimeter structural members of the trailer. Rivets or other mechanical fasteners can be used to support the perimeter of the roof panel. Thereafter, the externally mounted roof rails are mounted on top of the roof panel with its ends riveted or otherwise mechanically attached to the side rail structure.

A protective assembly may be positioned adjacent to the rear door of the trailer body to protect the frame of the rear door and the cargo loaded into and from the cargo space. The protective assembly includes an angled plate having a first end positioned adjacent to the top wall and a second end spaced apart from the top wall such that the angled plate is non-parallel with the top wall. This configuration causes objects to move away from the top wall during transport from the cargo space, thereby reducing the likelihood of collisions with the top wall and the rear door frame.

Assembly of the roof according to this invention is achieved using a fixture which supports the roof panel in a convex crowned shape, enabling the external roof bows to be bonded to the roof panel.

The trailer constructed in accordance with this invention provides a smooth seamless interior roof surface. During the loading and unloading process, it is possible for operators to move boxes or other payload along the roof without being caught on the roof structure as the cargo is moved along the length of the trailer.

BRIEF DESCRIPTION OF THE DRAWINGS

FIG. 1 is a tractor-trailer embodying the principles of the present invention;

FIG. 2 is a rear view of a body portion of the trailer taken from the perspective generally indicated by arrow 2 in FIG. 1;

DETAILED DESCRIPTION OF THE INVENTION

Figure 3:
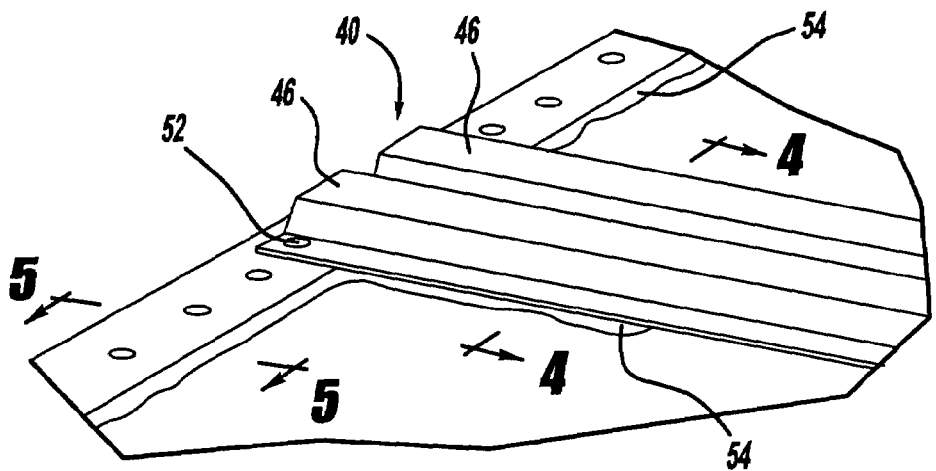
FIG. 3 is an enlarged isometric view of the portion of the trailer defined by line 3 in FIG. 1.

Referring now to the present invention FIG. 1 shows a tractor-trailer 10 having a trailer 12 for storing and transporting objects and a motor vehicle 14, such as a semi-truck, for towing the trailer 12. The tractor-trailer 10 is particularly suited for commercial transportation of goods.

As shown in FIGS. 1 and 2, the trailer 12 includes a trailer body 16 having a roof 18, a floor 20, a pair of side walls 22, 24, a front wall 26, and a rear door 28 cooperating to define a cargo space 30 (FIG. 5) for storing cargo. When the rear door 28 is in an open position, the trailer body 12 generally defines a loading opening 32 having a height H of about 111.5 inches and a width W of about 100 inches. Additionally, the trailer body 12 has a length L of about 40 to 53 feet. The floor 20 and the side walls 22, 24 are each preferably made of sheet metal or other sheet materials, and the floor 20 preferably includes support struts or another suitable support structure. The roof 18 is preferably made of a translucent or transparent material so that ambient light is able to enter the cargo space 30 and improve the visibility within the trailer 12.

The trailer body 12 includes a plurality of transversely extending reinforcing bows 40 that are mounted to the top surface of the roof 18 at various points along the length L of the trailer body 12. More specifically, the bows 40 each extend across the width W of the roof 18 to provide structural support thereto. The bows 40 each have a generally bowed shape so that the midpoint of each bow 40, which is positioned near the lateral midpoint of the trailer body width W, is slightly higher than the endpoints of each bow 40, which are positioned near the side walls 22, 24. The bowed shape adds structural support to the trailer and reduces the amount of moisture and dirt that collect on the roof 18.

Figure 4:
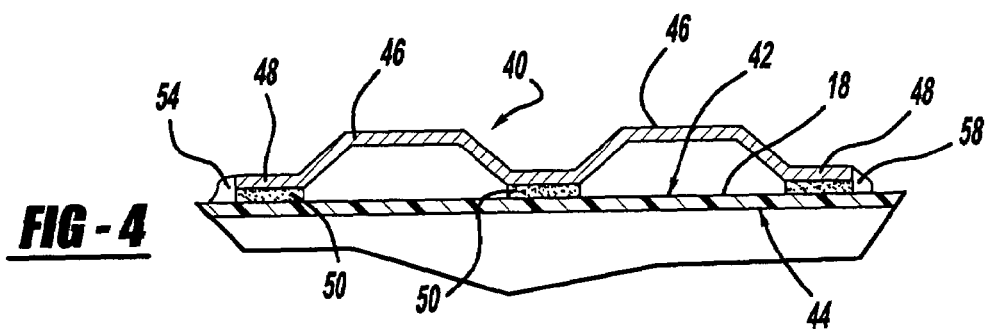
FIG. 4 is a cross-sectional view of the trailer taken along line 4-4 in FIG. 3.

As best shown by FIGS. 3 and 4, the bows 40 are each connected to an external surface 42 of the roof 18 so that an interior surface 44 (FIG. 4) of the roof 18 is generally smooth. The generally smooth interior surface 44 of the roof 18 reduces the likelihood that the roof 18 will be damaged during loading and unloading of cargo into and from the cargo space 30. Additionally, the generally smooth interior surface 44 of the roof 18 maximizes an effective volume of the cargo space 30 by permitting cargo containers with generally flat tops to be positioned relatively close to the interior surface 44 without contacting the roof 18.

As shown in FIGS. 3 and 4, the bows 40 each define a pair of generally U-shaped ribs 46 positioned adjacent to each other and a pair of securing flanges 48 for connecting the bows 40 to the roof 18. The U-shape of the ribs 46 further improves the strength of the bows 40 and defines a generally aerodynamic outer surface. The bows 40 are preferably single, unitary components to maximize strength and the part life, but they may alternatively be formed of multiple components secured together. Additionally, the bows 40 are preferably formed of a material having suitable strength and unit weight, such as steel, aluminum or a composite plastic. The bows 40 are preferably formed by formed sheet metal strips to a desired shape or by an extrusion process.

The bows 40 are preferably secured to the external surface 42 of the roof 18 by strips of adhesive 50 and rivets 52. The strips of adhesive 50 are preferably provided in the form of double-sided strips made of any suitable materials for bonding the bows 40 to the roof 18. Adhesive 50 can be provided as a bonding agent dispensed onto the parts before they are assembled. Additionally, a sealing agent such as caulk 54 may be used to form a generally water-tight seal between the bows 40 and the roof 18 and/or between the side walls 22, 24 and the roof 18.

Figure 5:
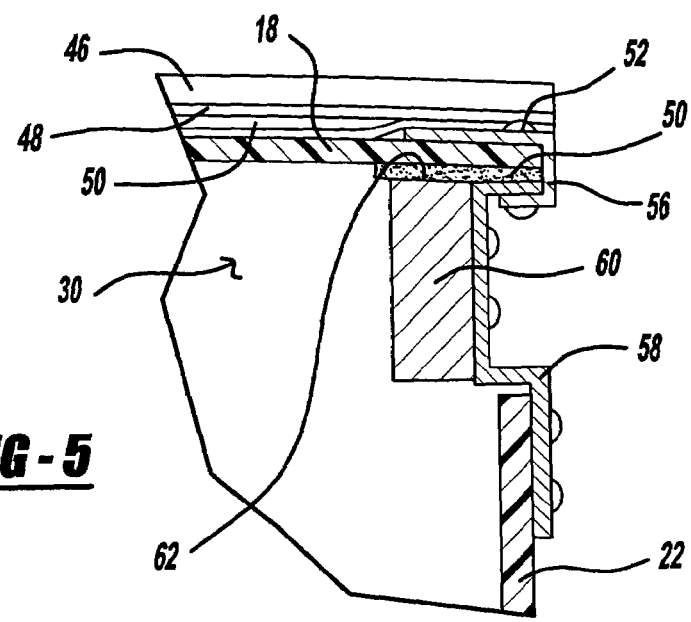
FIG. 5 is a cross-sectional view of the trailer taken along line 4-4 in FIG. 3.
Figure 6:
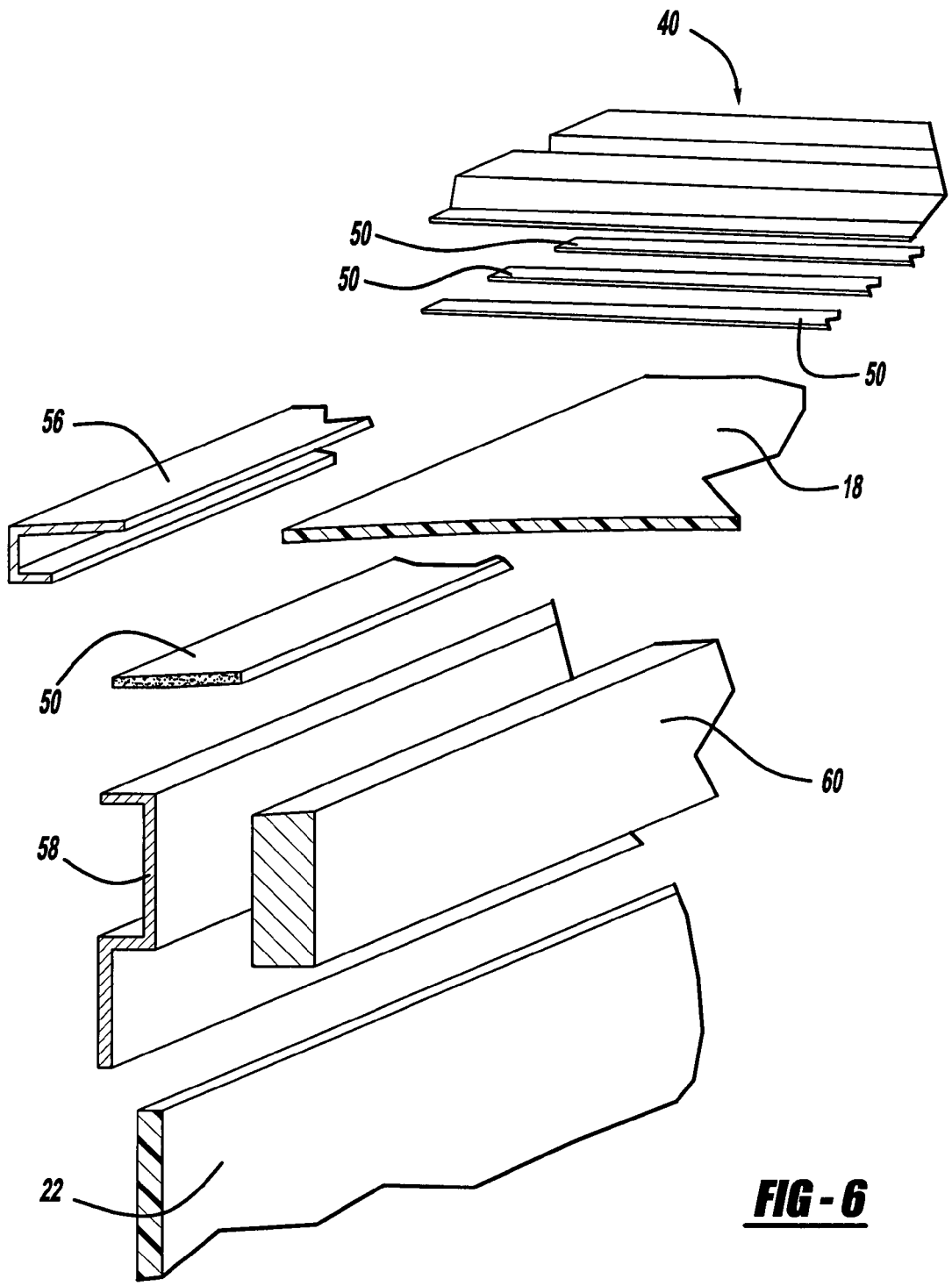
FIG. 6 is an exploded view of a the portion of the trailer shown in FIG. 5.

As shown in FIGS. 5 and 6, the side walls 22, 24 are coupled with the roof 18 by brackets 56, 58, a support beam 60, and adhesive 50 and rivets 52. More specifically, the first bracket 58 extends along the length of the side wall 22 and is riveted thereto. The second bracket 56, which also extends along the length of the side wall 22, is riveted to the first bracket 58 to form a slot for receiving the roof 18 and the adhesive strips 50. Furthermore, the support beam 60 is flush with a flange of the first bracket 56 to define a generally flat support surface 62 for the roof 18. These components form a secure and generally water-tight seal along the length of the trailer body 16.

The trailer 12 may also include a generally flat cover sheet (not shown) positioned over the top of the trailer body 16 and the bows 40 to improve the aerodynamics of the trailer 12.

During assembly of the trailer body 16, the roof 18 is temporarily supported by one or more temporary supports extending along the width of the trailer body 16. For example, an additional set of the bows 40 are temporarily provided on the underside of the roof 18 to support the roof 18 during assembly and to urge the roof 18 into the upwardly-bowed shape discussed above. More specifically, the temporary bows are connected to the support beams 60 so as to be generally flush with the upper wall 18 at the ends of the temporary bows. The bows may need to be shortened so as to extend along the distance between the respective support beams 60. As discussed above, the temporary bows have a midpoint that is higher than the end points, so that the central region of the roof 18 is urged upwards into an arcuate shape when the temporary bows are connected to the support beams 60. The bows 40 are then connected to the external surface 42 of the roof 18, thereby forming a flush and secure connection between the bows 40 and the roof 18. After the brackets 56, 58 are secured to the side and roofs 18, 22, 24, the temporary bows are removed from the internal surface 44 of the roof 18.

Figure 7:
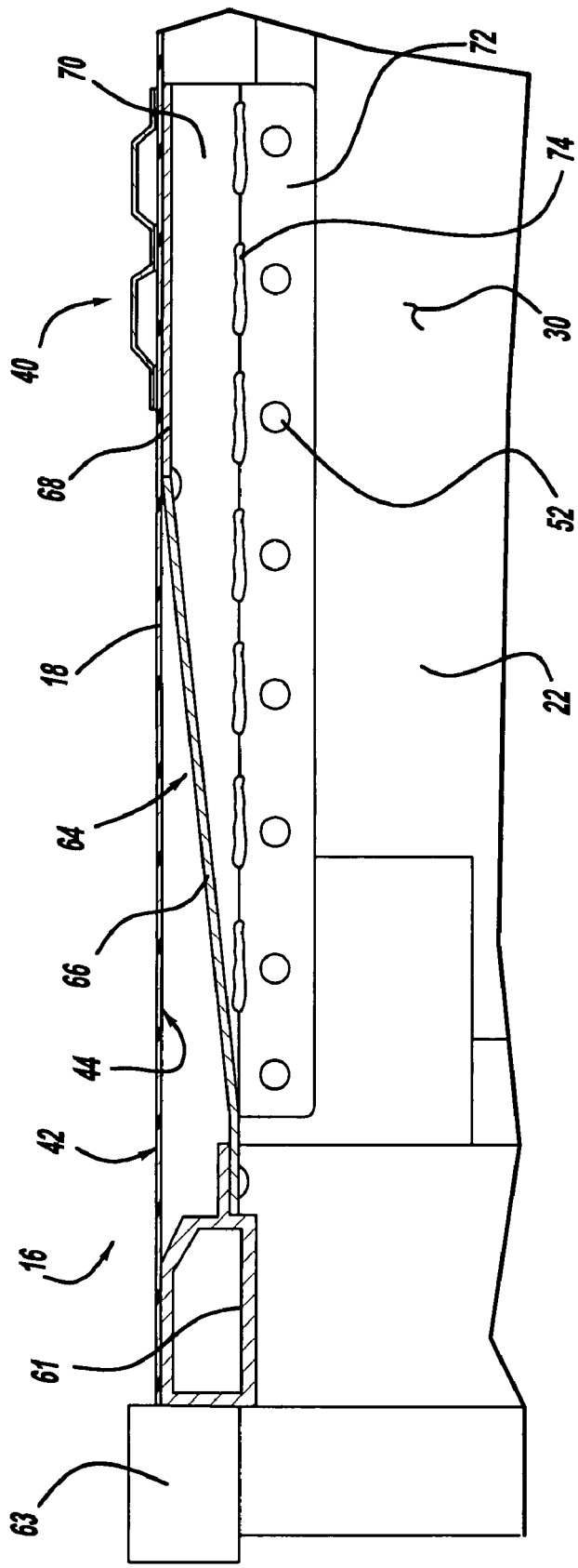
FIG. 7 is a cross-sectional view of the trailer taken along line 7 in FIG. 1.

Referring now to FIG. 7, the rear portion of the trailer includes a horizontal support beam 61 extending across the width of the trailer body 16 at the roof of the landing opening 29 and a support beam 63 for swinging door (not shown). The rear portion of the trailer further includes a protective assembly 64 connected to the roof 18 adjacent to the rear door to protect the trailer body 16 during loading and unloading of cargo into and from the cargo space 30. The protective assembly 64 preferably includes: an angled plate 66 providing a smooth, ramped surface leading between the support beam 61 and the roof 18 to prevent cargo from bluntly contacting the support beam 61 during loading and unloading; a top plate 68 flush against the interior surface 44 of the roof to protect the trailer body 16 from damage during loading and unloading; and a pair of side plates 70, 72 that are flush against the side walls 22, 24 to protect the side walls 22, 24 from damage during loading and unloading. The plates are preferably each made of a material having suitable strength and weight to protect the trailer body 16, such as steel, aluminum, or a composite material. Additionally the respective plates 66, 68, 70, and 72 are connected with each other by rivets 52, welds 74, or other suitable connections. Alternatively, the protective assembly 64 may be a single, one-piece component rather than a plurality of components fastened together.

It is therefore intended that the foregoing detailed description be regarded as illustrative rather than limiting, and that it be understood that it is the following claims, including all equivalents, that are intending to define the spirit and scope of this invention. More particularly, the apparatus and assembly described are merely an exemplary apparatus and assembly, and they are not intended to be limiting. Many of the steps and devices for performing the steps described above may be eliminated or replaced by alternative steps and devices.

What is claimed is:

1. A trailer body for use with a Class A commercial motor vehicle, the trailer body comprising:
    a top wall, a floor, and a pair of side walls cooperating to define a cargo space, wherein the top wall forming an interior surface partially defining the cargo space and an exterior surface opposite the interior surface, the top wall formed at least in part of a panel of a translucent or transparent material;
    a plurality of support bows defining an inverted U-shaped cross sectional configuration each extending substantially across the trailer body between the side walls, the support bows connected to the exterior surface of the top wall such that at least a substantial portion of the interior surface of the top wall is generally smooth;
    an adhesive bonding the support bows to the top wall;
    a front wall and a rear door cooperating with the top wall, the floor, and the pair of side walls to define the cargo space; and
    a protective assembly adjacent to the rear door to protect the trailer body during transport of cargo with respect to the cargo space wherein the protective assembly including an angled plate having a first end positioned adjacent to the top wall and a second end spaced apart from the top wall such that the angled plate is non-parallel with the top wall to protect a portion of the trailer body during transport of cargo with respect to the cargo space.

2. A trailer body as in claim 1, wherein each of the plurality of support bows including a pair of flanges extending along a length thereof and wherein the adhesive is placed between the flanges and the exterior surface of the top wall.

3. A trailer body as in claim 2, the trailer body further comprising a plurality of strips of the adhesive respectively positioned between the flanges of each of the support bows and the exterior surface of the top wall of the trailer body to secure the support bows to the top wall.

4. A trailer body as in claim 1, wherein the top wall is formed of a panel of a generally transparent material to further permit light to enter the cargo space.

5. A trailer body as in claim 1, wherein the protective assembly further includes a top plate positioned adjacent to the angled plate and generally flush against the top wall of the trailer body to further protect another portion of the trailer body during transport of cargo with respect to the cargo space.

6. A trailer body as in claim 5, wherein the protective assembly further includes a pair of side plates, each positioned generally flush against one of the side walls of the trailer body to protect yet another portion of the trailer body during transport of cargo with respect to the cargo space.

7. A trailer body as in claim 6, wherein the angled plate, the top plate, and the side plates are connected via mechanical fasteners.

8. A trailer body as in claim 6, wherein the angled plate, the top plate, and the side plates are a single, unitary component.

* * * * *